3,449,147
EPITAXIALLY COATING RUBY WITH DOPED ALUMINA

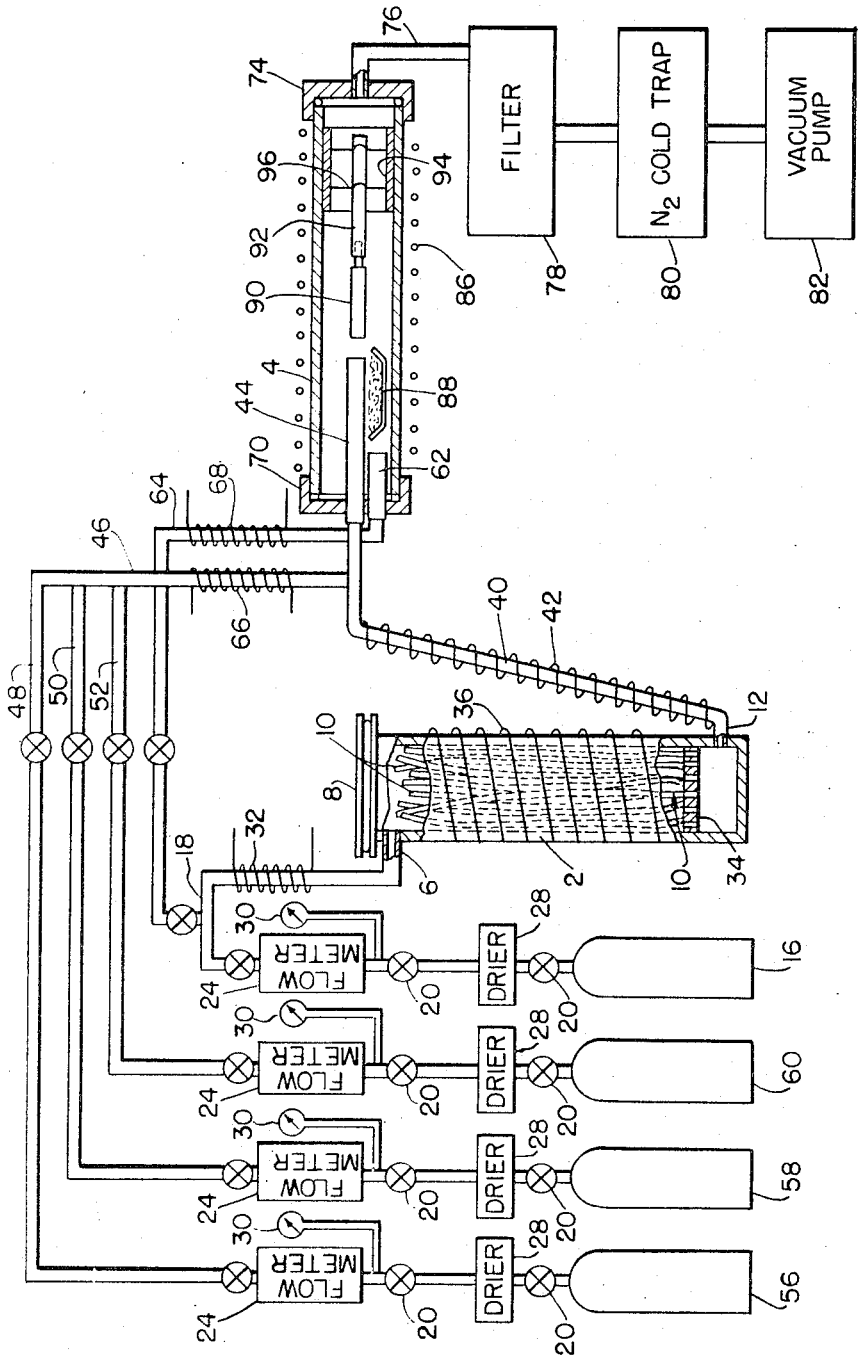

William B. Campbell, Belmont, and Philip S. Schaffer, Waltham, Mass., assignors to Lexington Laboratories, Inc., Cambridge, Mass., a corporation of Massachusetts
Filed Mar. 22, 1965, Ser. No. 441,805
Int. Cl. C23c *13/04;* B44d *1/14*
U.S. Cl. 117—33.3         11 Claims

ABSTRACT OF THE DISCLOSURE

Method of cladding the surface of a ruby laser with a layer of single crystal alumina doped with a rare earth element, vanadium, titanium, cobalt or nickel. The cladding is grown by deposition from the vapor state.

---

This invention relates to semiconductor crystal growth and more particularly to epitaxial growth of doped alpha-alumina on a ruby laser rod.

The lasing phenomenon occurs in appropriate hosts when impurity atoms are excited by light quanta above a certain threshold. Photons with wavelengths proportional to the excitation energy gap are emitted when the excited atoms return to ground state from a higher state. Since only discrete excitation levels exist, the wavelengths of the emitted light are distinct. In the case of ruby, several different types of laser action have been observed. Thus, for example, laser action may be observed at a wavelength of 6,943 A. in a pink ruby laser containing about 0.05% by weight of $Cr_2O_3$, at room temperature. On the other hand, red ruby having a chromium oxide concentration of about 0.5% exhibits laser action at wavelengths of 7.009 A. and 7,041 A. Operation of such solid state lasers is limited by superluminescence (sometimes called "depumping") which lowers laser beam intensity and over-all efficiency. This deleterious phenomenon is believed to occur when emitted photons not in the desired lasing direction interact with other excited ions and thereby stimulate them to emit other photons, with a resultant loss of energy from the desired coaxial laser beam. It is desirable that if such photons not in the desired lasing direction do not interact with excited ions on their first pass through the laser, they should be absorbed at the laser surface so that they cannot be reflected internally and thereby make additional passes through the crystal until interaction does occur.

Accordingly the object of this invention is to provide an optically pumped solid state laser wherein the outer surface of the doped host has a cladding which absorbs photons reaching that surface and thus reduces internal, secondary reflections.

It is recognized that this surface layer or cladding should not interfere with laser pumping. Accordingly another object is to provide a cladding for an optically pumped solid state laser which permits efficient transmittance of input light energy while also having the ability to absorb output light energy that is not in the desired lasing direction.

Of particular relevance to this invention is the fact that the wavelengths of the energy absorbed by ruby are different from the laser energy emitted by the same host. Accordingly a more specific object of this invention is to provide a method of depositing a cladding which will transmit light having wavelengths in the excitation band of ruby, e.g., wavelengths in the blue-green region (approximately 4,800–5,500 A.), and will absorb light with wavelengths corresponding to the laser radiation of a ruby, i.e., in the immediate region of 7,000 A.

It is also recognized that for such a cladding to be effective for its intended purpose, there must be little or no back reflection. Accordingly a further object is to provide a cladding which not only has the same index of refraction as the laser host but also is formed under conditions assuring lattice match with no discontinuous phases or boundary.

In the attainment of the foregoing and other objects of this invention as applied to ruby, it is postulated that a cladding which will suitably transmit and absorb energy in the manner described above is sapphire (alpha-alumina) containing a dopant known to absorb energy in the desired region. The most favorable dopants are rare earths exhibiting high absorption peaks in the region of 7,000 A., particularly $Tm^{3+}$, $Nd^{3+}$, $Pm^{3+}$, $Ho^{3+}$, and $Er^{3+}$. The cladding containing one or more of these dopants is deposited by a novel vapor phase growth process wherein the dopant is supplied in the form of a halide gas whose relative rate of flow is controlled to provide a predetermined dopant concentration in the cladding.

The foregoing objects and many of the attendant advantages of the invention will become more readily apparent from the following detailed specification when considered together with the accompanying drawing which illustrates an apparatus for practicing the preferred mode of the invention.

The preferred embodiment of our invention involves a cladding for ruby comprising a sapphire host doped with Tm. This preferred embodiment is described in detail hereinafter. However, it is to be understood that such description is presented by way of example and not limitation, and that the principles of our process are applicable to the production of a sapphire cladding doped with other desirable elements.

The novel vapor phase growth process of the present invention permits deposition on a ruby laser of a continuous homogeneous epitaxial layer of alpha-alumina doped with an appropriate absorbing ion. This layer is isothermally deposited at a temperature considerably below the melting point of ruby by passing selected reactant gases over the ruby rod at rates and under conditions enabling reaction to occur according to the following selected equation:

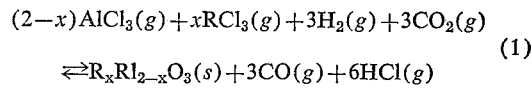

$$(2-x)AlCl_3(g) + xRCl_3(g) + 3H_2(g) + 3CO_2(g)$$
$$\rightleftharpoons R_xRl_{2-x}O_3(s) + 3CO(g) + 6HCl(g) \quad (1)$$

where R=rare earth or other appropriate element and $x>0$. The symbols $(g)$ and $(s)$ indicate gaseous and solid states respectively.

This reaction actually consists of a plurality of simultaneously occurring intermediate reactions which most probably are the following:

$$R(s) + 3/2Cl_2(g) \rightleftharpoons RCl_3(g) \quad (2)$$

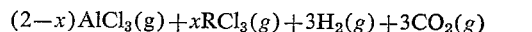
$$(2-x)AlCl_3(g) + xRCl_3(g) + 3H_2(g) + 3CO_2(g)$$

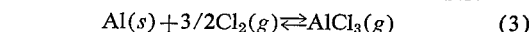
$$Al(s) + 3/2Cl_2(g) \rightleftharpoons AlCl_3(g) \quad (3)$$

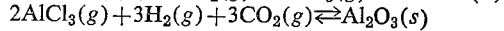
$$2AlCl_3(g) + 3H_2(g) + 3CO_2(g) \rightleftharpoons Al_2O_3(s)$$

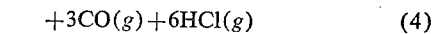
$$+ 3CO(g) + 6HCl(g) \quad (4)$$

$$2RCl_3(g) + 3H_2(g) + 3CO_2(g) \rightleftharpoons R_2O_3(s)$$

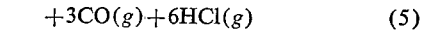
$$+ 3CO(g) + 6HCl(g) \quad (5)$$

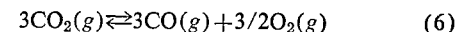
$$3CO_2(g) \rightleftharpoons 3CO(g) + 3/2O_2(g) \quad (6)$$

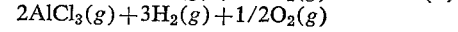
$$2AlCl_3(g) + 3H_2(g) + 1/2O_2(g)$$

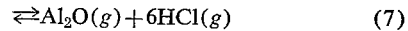
$$\rightleftharpoons Al_2O(g) + 6HCl(g) \quad (7)$$

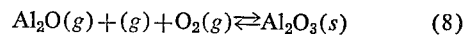
$$Al_2O(g) + (g) + O_2(g) \rightleftharpoons Al_2O_3(s) \quad (8)$$

The invention is based upon the over-all reaction identified by Equation 1 Because this reaction is thermodynamically favorable over a wide temperature range. In this connection it is to be observed that the equilibrium constant of the over-all reaction is represented by Equation 9:

$$K_p = \frac{a_{R_xAl_{2-x}O_3} P^3_{CO} P^6_{HCl}}{P^{2-x}_{AlCl_3} P^x_{RCl_3} P^3_{CO_2} P^3_{H_2}} \quad (9)$$

As indicated below, $x$ has a maximum value of about 1 wt. percent. Hence it will exercise little influence on $\Delta F°_{(1)}$ and $K_{p(9)}$ (the standard free energy change of the over-all reaction and the equilibrium constant, respectively) and is therefore eliminated in the calculations. Since the standard free energies of formation of each of the species involved are known, $\Delta F°_{(1)}$ and $K_{p(9)}$ may be readily calculated and these data are tabulated in the following table.

TABLE.—STANDARD FREE ENERGY CHANGE AND EQUILIBRIUM CONSTANT AS A FUNCTION OF TEMPERATURE FOR EQUATION 1

| °K. | °C. | $\Delta F°_{(1)}$ (kcal./mole) | log $K_p$ | $K_p$ |
|---|---|---|---|---|
| 500 | 227 | −43.83 | 19.16 | 1.45×10¹⁹ |
| 1,000 | 727 | −54.09 | 11.82 | 6.61×10¹¹ |
| 1,200 | 927 | −60.97 | 11.10 | 1.26×10¹¹ |
| 1,400 | 1127 | −67.86 | 10.59 | 3.89×10¹⁰ |
| 1,500 | 1227 | −71.38 | 10.40 | 2.51×10¹⁰ |
| 1,800 | 1527 | −81.78 | 9.92 | 8.32×10⁹ |
| 2,000 | 1727 | −87.17 | 9.54 | 3.47×10⁹ |

As seen in the table the standard free energy change is highly negative throughout the entire temperature range and becomes more negative with increasing temperature. Also the equilibrium constant is far greater than unity at all temperatures, indicating that the reaction is thermodynamically favorable over the entire temperature range.

The kinetics of the overall process for material transfer during condensation from a supersaturated vapor involve transport of reactant gases to the substrate-vapor boundary layer, reaction or deposition on the substrate and transport of gaseous products away from this layer. Since the reaction rate is probably the controlling factor at low temperatures, the overall reaction is not readily observable at low temperatures due to the low reaction rate. At higher temperatures which increase diffusion processes, the rate controlling factor is probably diffusion of material across the substrate-vapor boundary layer and growth is achieved more readily.

The perfection of the single crystal cladding deposited on the ruby rod is affected by the rate of growth which is controlled by the degree of supersaturation existing in the reaction zone, and this in turn is determined by temperature, total pressure, and reactant gas partial pressures. Optimum conditions of supersaturation will vary, although it is understood that supersaturation yielding suitable single crystal cladding may be achieved at various temperatures by suitably controlling the total pressure and the reactant gas partial pressures. The latter are controlled by modifying the flow of the reactant gases. It is also appreciated that the pressure conditions required to attain supersaturation at a given temperature will vary somewhat with different dopants.

It is to be noted that substitution of a cation into the $Al_2O_3$ lattice involves a relatively large quantity of energy and tends to produce strain due to differences in cation size. The size limiting dimension for substitution of Al are such that they are satisfied by all of the rare earth ions of interest. From calculation it appears that these ions and even other somewhat larger solute ions will enter the solvent lattice in interstitial positions in amounts up to at least about one weight percent.

Referring now to the drawing, the illustrated apparatus designed for the present invention essentially comprises an aluminum halide generator 2 and a reaction chamber 4. The aluminum halide generator is a vertical cylindrical unit formed of a non-reactive material such as a stainless steel alloy and includes an inlet 6 for introduction of a halogen gas, a sealed cover 8 which can be removed for inserting a supply of high-purity aluminum 10 into the unit where it can be reacted with the halogen gas to form aluminum halide vapor, and an outlet 12 for passing the aluminum halide vapor formed in the generator to the reaction chamber 4. The inlet 6 is connected to a pressurized halogen supply tank 16 via a line 18 which includes appropriate control valves 20, a flow meter 24, a drier 28 for removing moisture from the halogen gas, and a pressure guage 30. In the specific example of the invention described hereinafter, the halogen gas is chlorine. An electric resistance wire heating element 32 surrounds the line 18 and serves to pre-heat the halogen gas supplied to the halide generator. This heater is energized from a separately controllable power source (not shown) of conventional design. The aluminum of high purity which is to be converted into a metal halide comprises a group of aluminum strips which are supported within the generator unit on a perforated plate 34 disposed just above the outlet 12. The halide generator is itself surrounded by a second electrical heating element 36 which is controllably energized by another suitable power supply (not shown). The heater 36 permits heating the reactants within the halide generator to the temperature necessary to achieve generation of an aluminum halide according to the following reaction:

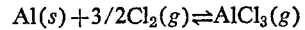

$$Al(s) + 3/2 Cl_2(g) \rightleftharpoons AlCl_3(g)$$

The aluminum halide gas newly formed in the halide generator is delivered to the reaction chamber 4 by means of a line 40 which is surrounded and heated by a third electrical resistance heating element 42 which also is controllably energized by a suitable power supply (not shown). The line 40 is connected to one tube 44 of a dual injector assembly mounted in one end of the reaction chamber 4. Also connected to tube 44 is a line 46 which leads to a plurality of supply lines 48, 50, and 52 that stem from separate pressurized supply tanks 56, 58, and 60 containing carbon monoxide, carbon dioxide and hydrogen gases. Each of these supply line 48, 50, and 52 is provided with control valves, flow meters, driers, and pressure gauges similar to those connecting the halogen tank 16 to the halide generator. The second tube 62 of the dual injector system is connected by a line 64 to the halogen supply line 18. Heating elements 66 and 68 are provided to preheat the gases in lines 46 and 64.

The reaction chamber 4 is fitted with removable non-reactive end caps 70 and 74 with the dual injector system mounted in the end cap 70. The opposite end cap 74 is provided with an outlet line 76 which is connected via a filter 78 and a nitrogen cold trap 80 to a vacuum pump 82 which is adapted to maintain a suitable pressure within the reaction chamber. The reaction chamber is surrounded by an electrical heating element 86 which is energized by a controllable power source (not shown). One or more thermocouples (not shown) are employed to monitor the temperature within the reaction chamber where the deposition occurs.

An alumina boat 88 is located in the reaction chamber. It rests on the bottom of the furnace and is located adjacent the discharge end of the lower tube 62 of the dual injector assembly. In practice the boat contains a charge of a selected rare earth, preferably in small particle form. Also located within the reaction chamber is a ruby rod 90 on which a single crystal cladding is to be formed. In the illustrated embodiment the ruby is formed with a reduced diameter end portion that is inserted into a suitable bore formed in one end of an alumina support rod 92. At its other end the rod is supported within an open alumina tube 94 by means of several wires 96 made of platinum or other non-reactive high temperature material. The tube 94 is slidable in the reaction chamber. This mode of supporting the ruby provides minimum obstruction to gas flow which should be substantially laminar with relation to the ruby substrate.

Following is an example illustrating a preferred form of the process used to deposit on a ruby rod a cladding consisting of an alpha-alumina host doped with $Tm^{3+}$ ions. In this example the single crystal growth is accomplished according to the following over-all reaction:

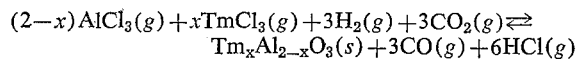

where the value of $x$ in weight percent of cladding is $0 < x < 1\%$.

EXAMPLE

A plurality of strips of highly pure aluminum measuring about .010 inch thick, 0.250 inch wide and 10–12 inches long are placed in the halide generator 2. A supply of Tm powder is placed in the alumina boat and a ruby rod measuring about one inch in diameter and about four inches long is mounted in the reaction chamber in the manner shown in FIG. 2. The reaction chamber is heated to a level where the ruby rod has a temperature of approximately 1,750° C. and the vacuum pump is operated so as to establish a reduced pressure in the reaction chamber. Then the temperature within halide generator 2 is brought up to about 350° C. and heater 32 is energized to a level sufficient to heat the chlorine gas from supply tank 16 to a temperature of about 250–300° C. before it enters the halide generator at the selected rate of flow. Heater 42 is operated so that the aluminum chloride gas produced in generator 2 will be at a temperature of at least 275° C. when it enters the reaction chamber. The heater in line 64 is set so as to preheat the second stream of chlorine gas to a temperature of about 300–350° C. before it enters the reaction chamber. The heater in line 46 is operated so as to preheat the mixed gases from tanks 56, 58, and 60 to a temperature of about 150° C.

The first gases to be delivered to the system are carbon monoxide, carbon dioxide, and hydrogen. They are fed at the following rates: CO—0.80 liter/min.; $CO_2$—0.20 liter/min.; and $H_2$—0.80 liter/min. Then chlorine gas is passed to the halide generator at a rate of 0.16 liter/min. and simultaneously chlorine gas is delivered to injector tube 62 at a rate of 0.04 liter per minute. Almost perfectly pure $AlCl_3$ is delivered to the reaction chamber from generator 2 and essentially pure $TmCl_3$ gas is formed on contact of chlorine gas with the thulium particles in the boat. The vacuum pump is operated so as to maintain a pressure of 5–10 torr in the reaction chamber during the run.

Under the foregoing temperature and pressure conditions and flow rates, the $AlCl_3$ and $TmCl_3$ gases react with the $H_2$ and $CO_2$ gases at a rate that provides controlled supersaturation to a degree sufficient for epitaxial vapor deposition and growth to occur on the ruby substrate. After approximately 6 hours reactant gas flow is terminated and the reaction chamber is flushed with argon gas. The latter not only purges the system of reactant gases but also restores the reaction chamber to atmospheric pressure so as to permit safe retrieval of the ruby. The latter is found to have a homogeneous single crystal cladding consisting essentially of an alpha-alumina host uniformly doped with $Tm^{3+}$ ions in an amount approximately .05 weight percent. The thickness of the cladding is about 0.090 inch. The orientation of the single crystal cladding is the same as that of the ruby substrate. The interface between the substrate and cladding (visible due to a marked difference in color) is continuous and reveals low strain due to excellent substrate-deposition lattice match.

Similar results are obtainable with the other rare earths noted above, namely, Nd, Pm, Ho, and Er. The reaction conditions, e.g. flow rates, temperatures, and pressures, when using these other rare earths will be substantially the same as in the foregoing example. It is to be understood also that any of the other halogens (Br, I and F) may be used in place of chlorine in the present invention, but these other halogens are not preferred because they are more hazardous and/or less convenient to use than chlorine.

It is to be appreciated also that the process of this invention may be used to deposit a sapphire host doped with other elements not mentioned above which have ionic radii of the same order of magnitude as aluminum and which also form halides which are volatile and will hydrolyze to form oxides at temperatures within the range covered by the table. Illustrative of such other elements are nickel, vanadium, titanium, cobalt, and manganese.

We claim:
1. The process of cladding a ruby laser comprising reacting aluminum with a halogen gas to form aluminum halide gas, reacting a rare earth with a halogen gas to form a rare earth halide gas, passing said halide gases into a chamber containing a ruby, simultaneously passing an additional quantity of said halogen gas together with hydrogen, carbon monoxide and carbon dioxide gases into said same chamber, and maintaining the temperature and pressure within said chamber at values sufficient for the gases therein to react and deposit on the surface of said ruby a single crystal cladding of alumina doped with said rare earth.

2. The process of claim 1 wherein the rates of flow of said halide gases into said reaction chamber are adjusted to achieve a cladding containing up to about one weight percent of rare earth ion.

3. The process of claim 1 wherein the rare earth elements in said single crystal cladding are members of the class consisting of Tm, Nd, Pm, Er, and Ho.

4. The process of cladding a ruby with doped alpha-alumina comprising the steps of providing two different halide gases, one of which is aluminum halide and the other of which is a halide of an element of the class consisting of vanadium, titanium, cobalt, manganese, nickel and rare earth metals, passing said halide gases to a chamber containing a ruby, simultaneously passing a halogen gas together with hydrogen, carbon monoxide and carbon dioxide gases into said same chamber, and maintaining the temperature and pressure within said chamber at values sufficient for the gases therein to react and deposit on the surface of said ruby a single crystal cladding of alumina doped with said element.

5. A process as defined by claim 4 wherein the flow rates of said halide gases are adjusted to yield a maximum concentration of about 1 weight percent of dopant in said cladding.

6. The process of claim 4 wherein said element is a member of the group consisting of vanadium, titanium, cobalt, manganese, and nickel.

7. A process as defined by claim 4 wherein said element is a rare earth metal.

8. A process as defined by claim 7 wherein said element is a member of the group consisting of Tm, Nd, Pm, Er, and Ho.

9. The process of claim 8 wherein the light absorption spectrum of said cladding exhibits a peak in the region of about 7,000 A.

10. The process of claim 8 wherein the light transmittance spectrum of said cladding exhibits relatively high transmittance of wavelengths of 4,800–5,500 A.

11. The process of cladding a ruby with doped alpha-alumina comprising the steps providing two different halide gases, one of which is aluminum halide and the other of which is a halide of an element of the class consisting of vanadium, titanium, cobalt, manganese, nickel and rare earth metals, passing said halide gases to a reaction chamber containing a ruby, simultaneously passing hydrogen and carbon dioxide gases into said chamber, and maintaining the temperature and pressure within said chamber at values sufficient for the gases therein to react and deposit on the surface of said ruby a single crystal cladding of alumina doped with said element.

References Cited
UNITED STATES PATENTS

| | | | |
|---|---|---|---|
| 3,087,374 | 4/1963 | Devlin | 331—94.5 |
| 3,131,082 | 4/1964 | Gambino | 252—62.57 X |
| 3,179,899 | 4/1965 | Fox | 331—94.5 |
| 3,233,189 | 1/1966 | Guggenheim et al. | 331—94.5 |
| 3,306,768 | 2/1967 | Peterson. | |

OTHER REFERENCES

Electronics, vol. 35, Mar. 9, 1962, p. 8 relied upon.
Valpey Crystal Corporation, received Mar. 15, 1962, 2 pages.
Valpey Crystal Corporation, October 1961, 2 pages.
Powell et al., Vapor Plating, 1956, pp. 136 to 140 relied upon.

ALFRED L. LEAVITT, *Primary Examiner.*

A. GOLIAN, *Assistant Examiner.*

U.S. Cl. X.R.

106—42; 117—106, 201; 331—94.5